(12) United States Patent
Kokku et al.

(10) Patent No.: US 7,257,248 B2
(45) Date of Patent: Aug. 14, 2007

(54) NON-CONTACT MEASUREMENT SYSTEM AND METHOD

(75) Inventors: Raghu Kokku, Secundrabad (IN); Glen William Brooksby, Glenville, NY (US); Peter Henry Tu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 593 days.

(21) Appl. No.: 10/249,279

(22) Filed: Mar. 27, 2003

(65) Prior Publication Data

US 2004/0190764 A1  Sep. 30, 2004

(51) Int. Cl.
  *G06K 9/00*  (2006.01)
  *G01C 9/00*  (2006.01)
  *G01C 17/00*  (2006.01)
  *G01C 19/00*  (2006.01)
  *G06F 15/00*  (2006.01)

(52) U.S. Cl. ...................... 382/154; 702/153

(58) Field of Classification Search ............... 702/152, 702/153; 382/154
  See application file for complete search history.

(56) References Cited

U.S. PATENT DOCUMENTS

| | | | | |
|---|---|---|---|---|
| 4,525,858 A | * | 6/1985 | Cline et al. | 382/154 |
| 4,593,967 A | * | 6/1986 | Haugen | 359/18 |
| 4,819,197 A | * | 4/1989 | Blais | 708/207 |
| 5,396,331 A | * | 3/1995 | Kitoh et al. | 356/611 |
| 5,565,870 A | * | 10/1996 | Fukuhara et al. | 342/70 |
| 5,661,667 A | * | 8/1997 | Rueb et al. | 702/95 |
| 5,781,658 A | * | 7/1998 | O'Gorman | 382/172 |
| 6,259,519 B1 | * | 7/2001 | Hooker et al. | 356/139.03 |
| 6,496,262 B1 | * | 12/2002 | Meng et al. | 356/457 |
| 6,512,993 B2 | * | 1/2003 | Kacyra et al. | 702/159 |
| 6,539,106 B1 | * | 3/2003 | Gallarda et al. | 382/149 |
| 6,539,330 B2 | * | 3/2003 | Wakashiro | 702/152 |

(Continued)

OTHER PUBLICATIONS

Shortis, MR., Clarke, T.A., Short, T. 1994, A Comparison of Some Techniques for the Subpixel Location of Discrete Target Images, Videometrics III, SPIE vol. 2350, Boston, pp. 239-250.

Carson Steger, 1998, Evaluation of the Sub-Pixel Line and Edge Detection Precision and Accuracy, International Archieves of Photgrammetry and Remote Sensing, vol. XXXII, Part 3/1, 256-264.

*Primary Examiner*—Bhavesh M Mehta
*Assistant Examiner*—Damon M Conover
(74) *Attorney, Agent, or Firm*—Jean K. Testa; Curtis B. Brueske

(57) ABSTRACT

A system and method for non-contact measurement of a complex part is provided. The method comprises acquiring an image of the complex part including imposed laser lines on the complex part using at least one imaging device, determining a span of interest of the complex part being representative of at least a portion of the complex part and which comprises information related to a plurality of dimensions of a surface of the complex part, extracting information corresponding to the laser lines from the span of interest to reduce computation and further extracting a plurality of unique points from the information corresponding to the laser lines, the plurality of unique points representing the plurality of dimensions of the surface. The plurality of unique points is used for reconstructing a three-dimensional (3D) representation of the surface of the complex part.

25 Claims, 7 Drawing Sheets

U.S. PATENT DOCUMENTS 6,556,307 B1 * 4/2003 Norita et al. ................ 356/608
6,965,843 B2 * 11/2005 Raab et al. ................. 702/152
6,987,531 B2 * 1/2006 Kamon .................... 348/211.4
7,046,377 B2 * 5/2006 Leikas ........................ 356/611

* cited by examiner

NON-CONTACT MEASUREMENT SYSTEM AND METHOD

BACKGROUND OF THE INVENTION

The invention relates generally to non-contact measurement systems, and more specifically to a method and system for non-contact measurement of dimensions of a surface of a complex part.

Surface measurement of complex parts is of vital importance in manufacturing and repair industries. Typically, surface measurements are done by a contact method where the measuring device is in contact with the complex part. Alternatively, surface measurement is performed with specially fabricated gauges. Such measurement systems are typically costly, time consuming and susceptible to measurement errors. In other situations, the part may be too hot from the manufacturing process for contact based measurements. Most contact based methods usually require an unbreakable probe tip used for measurement. Such probes are usually expensive. In industries where parts are manufactured in large numbers, the number of probes used for measurements may be few in number. Thus, inspecting a large number of parts using a few probes becomes time consuming, which is undesirable.

Non-contact based measurement systems are also used for surface measurement. A problem with some non-contact based measurement systems is that they are time consuming because such methods usually employ heavy computation or a lot of data to interpret. For example, non-contact measurement systems may need to extract background information such as the fixture, noise, etc. that is also present in images containing the part to be inspected. As the manufacturing tolerances become tighter, there is a corresponding increase in the demands for metrology techniques for maintaining the tolerances. The need for quality and performance testing has become an integral part of the production or manufacturing process.

It would therefore be desirable to employ a non-contact measurement system for measuring surface dimensions of complex parts in a fast and cost-effective manner.

BRIEF SUMMARY OF THE INVENTION

Briefly, in accordance with one embodiment of the invention, a method for non-contact measurement of a complex part is provided. The method comprises acquiring an image of the complex part including imposed laser lines on the complex part using at least one imaging device, determining a span of interest of the complex part being representative of at least a portion of the complex part and which comprises information related to a plurality of dimensions of a surface of the complex part and extracting information corresponding to the laser lines from the span of interest to reduce computation and further extracting a plurality of unique points from the information corresponding to the laser lines, the plurality of unique points representing the plurality of dimensions of the surface.

In another embodiment, a system for non-contact measurement of a complex part is provided. The system comprises at least one imaging device positioned at a pre-determined distance from the complex part and configured for acquiring an image of the complex part including imposed laser lines on the complex part. The system further comprises at least one processor coupled to the imaging device and receiving the image. The processor is configured for determining a span of interest of the complex part being representative of at least a portion of the complex part and which comprises information related to a plurality of dimensions of a surface of the complex part, and extracting information corresponding to the laser lines from the span of interest to reduce computation and further extracting a plurality of unique points from the information corresponding to the laser lines, the plurality of unique points representing the plurality of dimensions of the surface.

In an alternate embodiment, a system for non-contact measurement of a complex part is provided. The system comprises at least one imaging device, at least one intermediate processor and a main processor. The imaging device is positioned at a pre-determined distance from the complex part and is configured for acquiring an image of the complex part including imposed laser lines on the complex part. The intermediate processor is coupled to the imaging device and receives the image. The intermediate processor is configured for determining a span of interest of the complex part being representative of at least a portion of the complex part and which comprises information related to a plurality of dimensions of a surface of the complex part. The intermediate processor is further configured for extracting information corresponding to the laser lines from the span of interest to reduce computation and further extracting a plurality of unique points from the information corresponding to the laser lines, the plurality of unique points representing the plurality of dimensions of the surface. The main processor is configured for reconstructing a three-dimensional (3D) representation of the surface of the complex part using the plurality of unique points, wherein the 3D representation is used for inspection.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
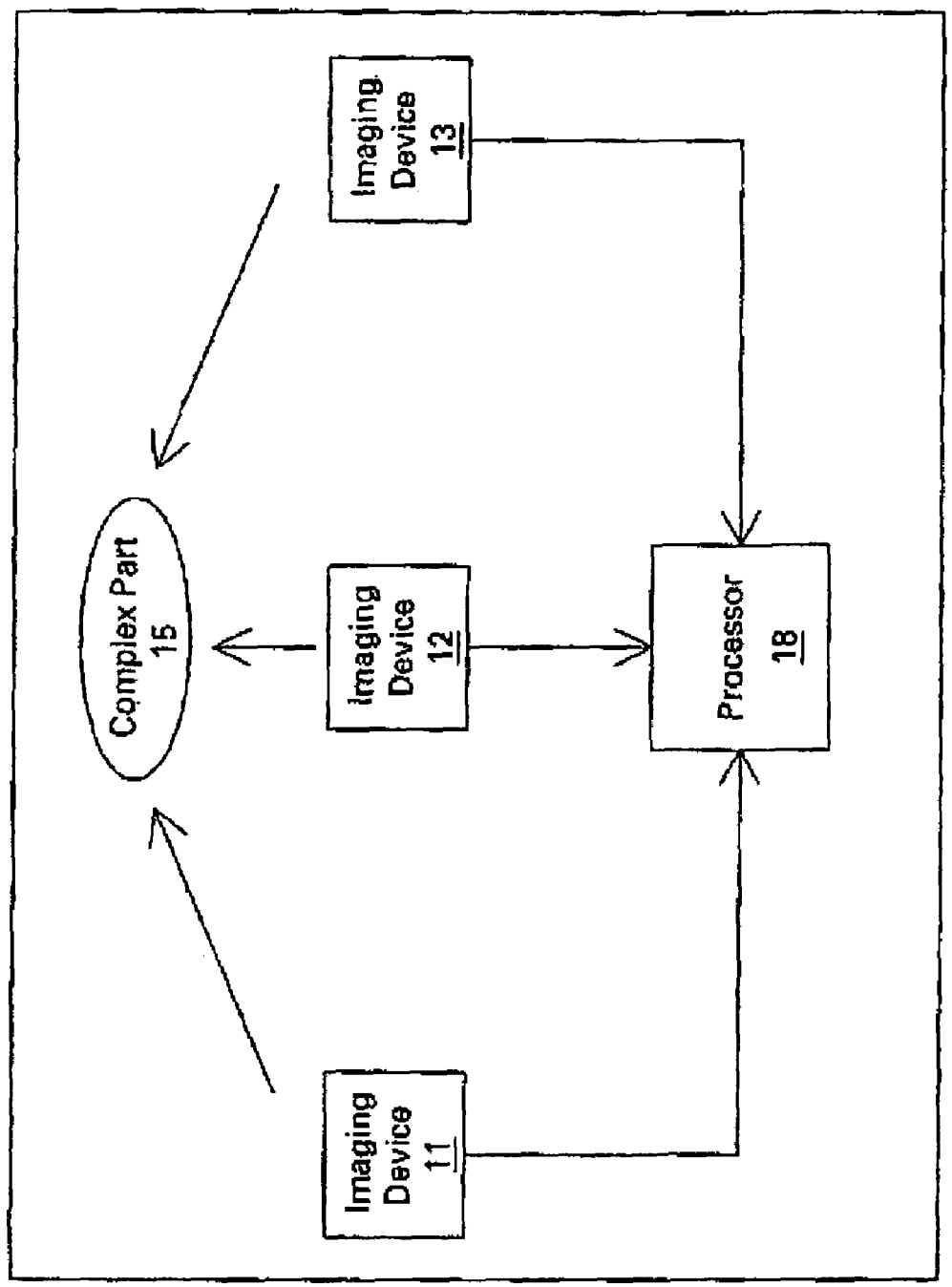
FIG. 1 is a block diagram of an embodiment of a system used in the non-contact measurement of a surface.

FIG. 1 is a block diagram illustrating an embodiment of a system for non-contact measurement of a complex part 15. The complex part is illuminated by imposing laser lines. The system comprises at least one imaging device and at least one processor. The illustrated embodiment comprises imaging devices 11, 12 and 13 and processor 18. Each component is described in further detail below.

As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Imaging devices 11, 12, 13 are positioned at a predetermined and fixed distance from the complex part. The imaging devices are configured for acquiring multiple images of the complex part including imposed laser lines on the complex part. The laser lines are imposed by any number of known techniques, which will be described in more detail with reference to FIG. 2. In one embodiment, the multiple images correspond to multiple views of the complex part. In one embodiment, the imaging devices comprise analog and/or digital cameras.

It is desirable to acquire the multiple images with a plurality of fixed imaging devices (such as 11, 12 and 13) positioned to acquire multiple views at their respective fixed positions and in which the complex part is also fixed in position in, for example. However, in an alternative embodiment, a single camera could be employed and the camera or complex part would be movable, for example rotatable, so that the camera can acquire multiple views of the complex part. In this embodiment, additional steps of registering the camera or complex part location as well as additional image processing steps may be required.

Processor 18 is coupled to the imaging devices and is configured for receiving the images from each imaging device. For conciseness, the description is continued with reference to the processing of a single image. However, it may be noted that the processing steps may be applied to multiple images as well.

The processor is configured for determining a span of interest of the complex part, the span of interest being representative of at least a portion of the image of the complex part. The span of interest as used herein refers to the portion of the image of the complex part. The span of interest comprises information corresponding to the portion of the complex part illuminated by the laser lines as well as the non-illuminated portions of the complex part. In one embodiment, the span of interest is localized to the illuminated complex part and thus does not comprise information related to the background in which the complex part is placed and a structure on which the complex part is mounted. By determining only a span of interest and subsequently using the span of interest in further processing, the computation is substantially reduced. The step of determining the span of interest will be described in greater detail with reference to FIG. 3.

The processor extracts information corresponding to the laser lines from the span of interest. The step of extracting the information corresponding to the laser lines is described in greater detail with reference to FIG. 4. A plurality of unique points is then extracted from the information corresponding to the laser lines, and the plurality of unique points represent a plurality of dimensions of a surface of the complex part. The step of extracting the plurality of unique points is described in greater detail with reference to FIG. 5. The processor uses the plurality of unique points to reconstruct a three-dimensional (3D) representation of the surface of the complex part. The 3D representation may be used for inspection purposes in a manufacturing unit.

The method and each of the steps described above from which the processor generates the 3D representation of the complex part is described in further detail with reference to FIG. 2.

Figure 2:
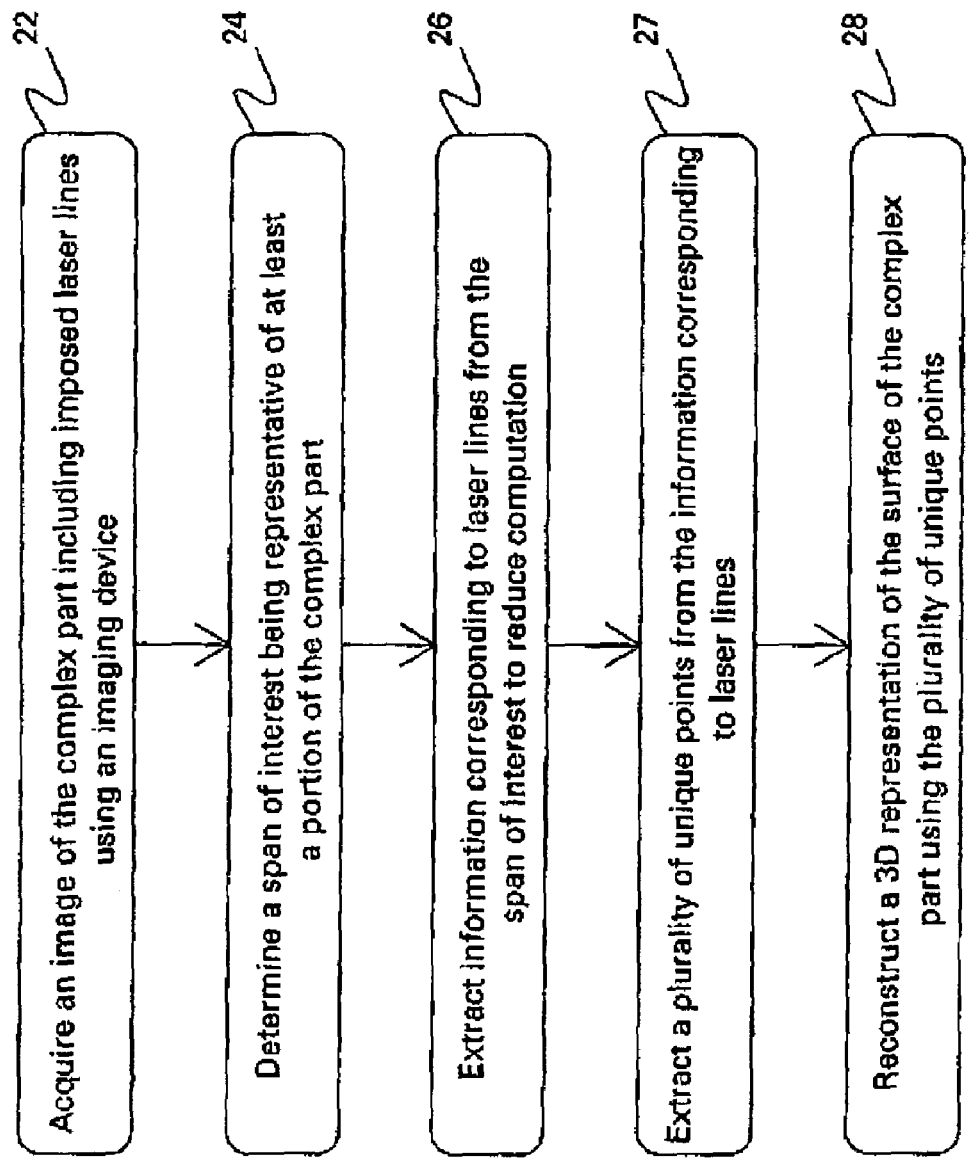
FIG. 2 is a flow chart illustrating the method by which a 3D representation of the surface is generated.

FIG. 2 is a flow chart illustrating the method by which the dimensions of a surface of a complex part can be measured by a non-contact measurement method. In the illustrated embodiment, the complex part is illuminated by imposing laser lines. In a known manner, the laser lines are emitted using a laser source. In an embodiment, a PHA model having a 10 mW single line projector of 670 nm available from Lasiris is used.

In step 22, an image of the complex part is acquired including the imposed laser lines, using an imaging device. In an embodiment, the imaging devices comprise digital cameras and/or analog cameras. In the illustrated embodiment, the laser source is mounted on the imaging device.

In step 24, a span of interest is determined, the span of interest being representative of at least a portion of the image of the complex part. The portion of the complex part comprises information related to the plurality of dimensions of the surface of the complex part. Determining the span of interest is described in greater detail with reference to FIG. 3.

In step 26, the information corresponding to the laser lines is extracted from the span of interest. In an exemplary embodiment, the laser lines are parallel to each other. However, it is to be appreciated that other laser line patterns such as grid patterns may be applicable but may require additional processing steps that will be described herein. It may be noted that by extracting the information corresponding to the laser lines, the computation required to analyze the image reduces substantially. The step of extracting the information corresponding to the laser lines is described in greater detail with reference to FIG. 4.

In step 27, a plurality of unique points are extracted from the information corresponding to the laser lines. The plurality of unique points represent the plurality of dimensions of the surface of the complex part. The step of extracting the plurality of unique points is described in greater detail with reference to FIG. 5.

In step 28, a three-dimensional (3D) representation of the surface of the complex part is reconstructed using the plurality of unique points. The 3D representation can be used for analysis during inspection. Various steps in the above flow chart are described in further detail below with reference to FIGS. 3 through 5.

It may be noted that various pre-processing techniques such as Gaussian smoothing or median filtering, which are well known in the art, can be applied on the image (acquired in step 22) to enhance the quality of the image by reducing the background noise. In the illustrated embodiment, the span of interest separation is performed on the image after applying Gaussian smoothing.

Figure 3:
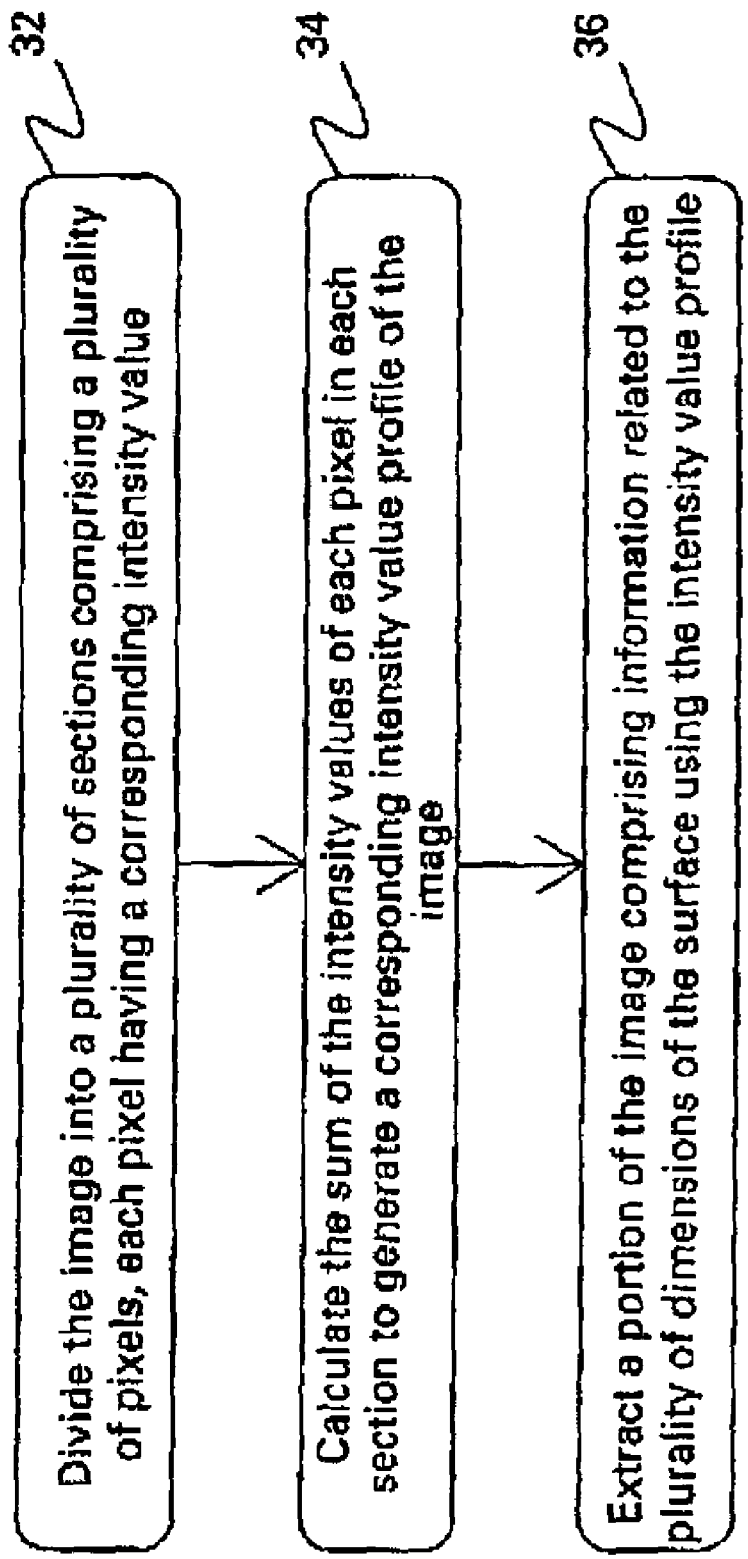
FIG. 3 is a flow chart illustrating a method by which the span of interest is generated.

FIG. 3 is a flow chart illustrating in detail the manner in which step 24 (of FIG. 2) corresponding to determining the span of interest from the image, is executed.

In step 32, the image is divided into a plurality of sections and each section comprises a plurality of pixels having a corresponding intensity value. In an embodiment, the sections comprise rows of 16, 24, 36, and 54 pixels. In an embodiment, the image is divided into rectangular sections. In another embodiment, the image is vertically divided into rectangular sections.

In step 34, the sum of the intensity values of each pixel in each section is calculated to generate a corresponding intensity value profile of the image.

In step 36, a portion of the image is extracted, the portion comprising information related to the plurality of dimensions of the complex part using the intensity value profile of the image. By analyzing the intensity value profile, the span of interest can be determined. The span of interest represent those areas of the complex part that comprise information related to the dimensions of the complex part. In one embodiment, the span of interest corresponds to the information related to the illuminated and non-illuminated regions of the complex part and excludes information such as the surrounding background in which the complex part is placed and the structure on which the complex part is mounted. The method by which the intensity value profile is analyzed is similar to the method by which the information corresponding to laser lines is extracted as described in FIG. 4.

By determining the span of interest as described above, the processing on the entire image (which includes regions that do not comprise information that is representative of the dimensions of the surface of the complex part) is eliminated thereby accelerating the reconstruction process discussed in step 28 of FIG. 2.

Figure 4:
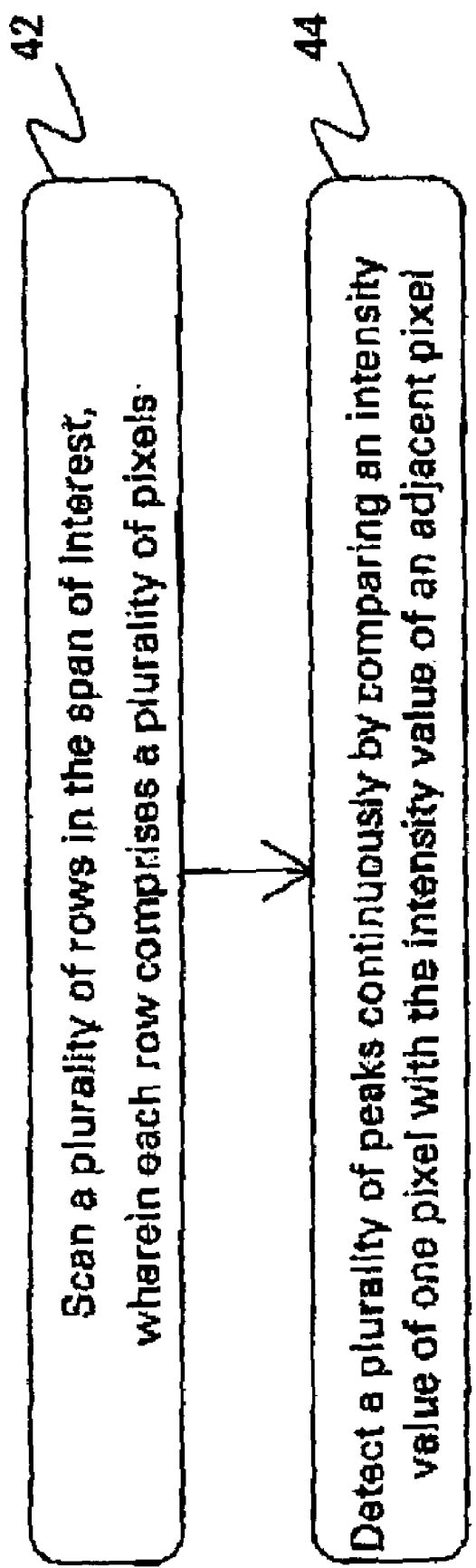
FIG. 4 is a flow chart illustrating the manner in which information corresponding to the laser lines is extracted.

FIG. 4 is a flow chart illustrating in detail the manner in which the laser lines are extracted from the span of interest (step 26 of FIG. 2) is executed, in one embodiment.

In step 42, a plurality of rows is scanned in the span of interest. Each row comprises a plurality of pixels.

In step 44, a plurality of peaks is detected in each row of the image, the plurality of peaks representing the information corresponding to the imposed laser line. In the illustrated embodiment, the plurality of peaks is detected by continuously comparing an intensity value of one pixel in a row with the intensity value of an adjacent pixel in the row. In one embodiment, the peak is detected by performing a first derivative of a pixel with the neighboring pixels of the row. In another embodiment, the peak is detected by performing a second derivative of a pixel with the neighboring pixels of the row.

The above method describes the manner in which the information related to the laser lines is extracted, in one embodiment. In an alternate embodiment, the information corresponding to the laser lines is extracted from the span of interest by generating a histogram based on the intensity values of the plurality of pixels present in the span of interest. The information related to the laser lines is extracted using the histogram based on a threshold count value, the laser line information falling in the region of the histogram to the left (or right) of the threshold count value.

Figure 5:
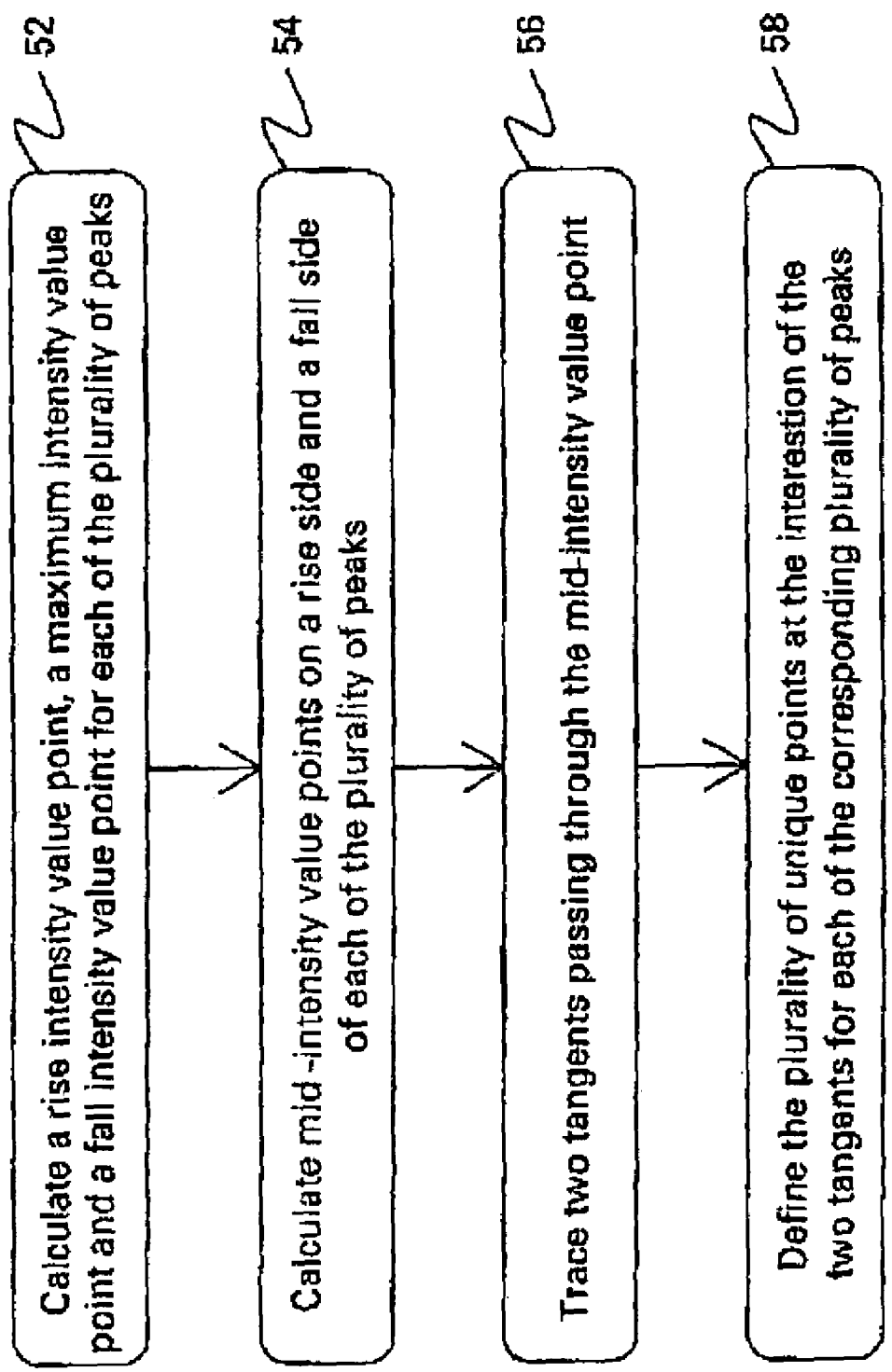
FIG. 5 is a flow chart illustrating the manner in which the plurality of unique points is extracted.

FIG. 5 is a flow chart illustrating in detail the method by which the plurality of unique points are extracted from the plurality of peaks (step 27 of FIG. 2).

In step 52, a rise intensity value point on a rising side of the peak, a maximum intensity value point and a fall intensity value point on the falling side of the peak, is calculated for each of the plurality of peaks that are extracted. The rise intensity value point corresponds to the point where the peak starts to rise, the maximum intensity value point corresponds to the maximum value of the peak, and the fall intensity value point is the point where the intensity value flattens.

For particular peaks that do not have equal rise intensity value and fall intensity value points, a foot intensity value point is calculated. By calculating the foot intensity value point, the detected peak is balanced and thus reduces computation complexities.

In step 54, a mid-intensity value point is calculated on the rising side and the falling side of each of the plurality of peaks detected as described above. The mid-intensity value point is calculated according to the equation:

$$E_M = E_P + (E_{Max} - E_P)/2$$

where $E_M$ corresponds to the mid-intensity value point, $E_P$ corresponds to the foot intensity value point and $E_{Max}$ is the maximum intensity value point.

In step 56, two tangents are traced which pass through the mid-intensity value point on the rising side and the falling side of each of the plurality of peaks. In an embodiment, the tangents can be traced using a Cubic Spline fit on the peak. Cubic Spline is a form of piecewise polynomial regression defined by the following equation:

$$y = a_i(x-x_i)^3 + b_i(x-x_i)^2 + c_i(x-x_i) + d_i$$

where i is the interval, and $x_i$ represents the x-value at the start of the interval. The values of $a_i$, $b_i$, $c_i$ and $d_i$ determine the curve.

In another embodiment, the tangents are traced from the mid-intensity value points based on its neighboring pixels. Let P1-P2-P3 be neighboring pixels on a peak and P2 is detected as the mid-intensity value point. In order to trace a tangent at point P2 on the curve P1-P2-P3, a tangent line passing through the point P2 is parallel to the line passing through P1 and P3. That is, the tangent line passing through the mid-energy point has the same slope as the line passing through P1 and P3. With the slope intercept form, the tangent line equation can be determined and the tangents can be traced through the mid-intensity value points.

In step 58, a plurality of unique points are extracted at the intersection of the two tangents for each of the corresponding plurality of peaks.

Figure 6:
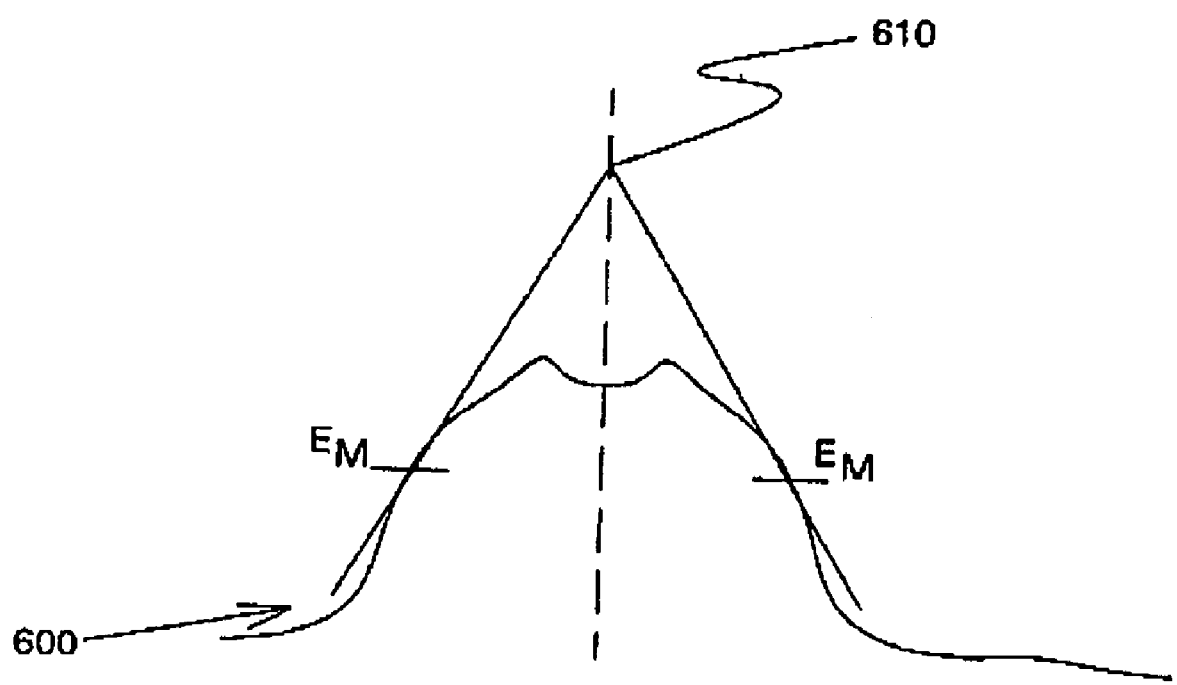
FIG. 6 is a graph illustrating the manner in which a unique point is detected from a peak in one embodiment.

FIG. 6 is a diagram illustrating the tangents drawn on the rising side and the falling side of peak 600 and passing through the mid-energy points $E_M$. The unique point is represented by point 610. The plurality of unique points are used for reconstructing the 3D representation of the complex part.

In another embodiment, the plurality of unique points are extracted by identifying a point such that the sum of intensity values on the right of a peak equals the sum of intensity values on the left of the peak. Such a method is illustrated in FIG. 7.

Figure 7:
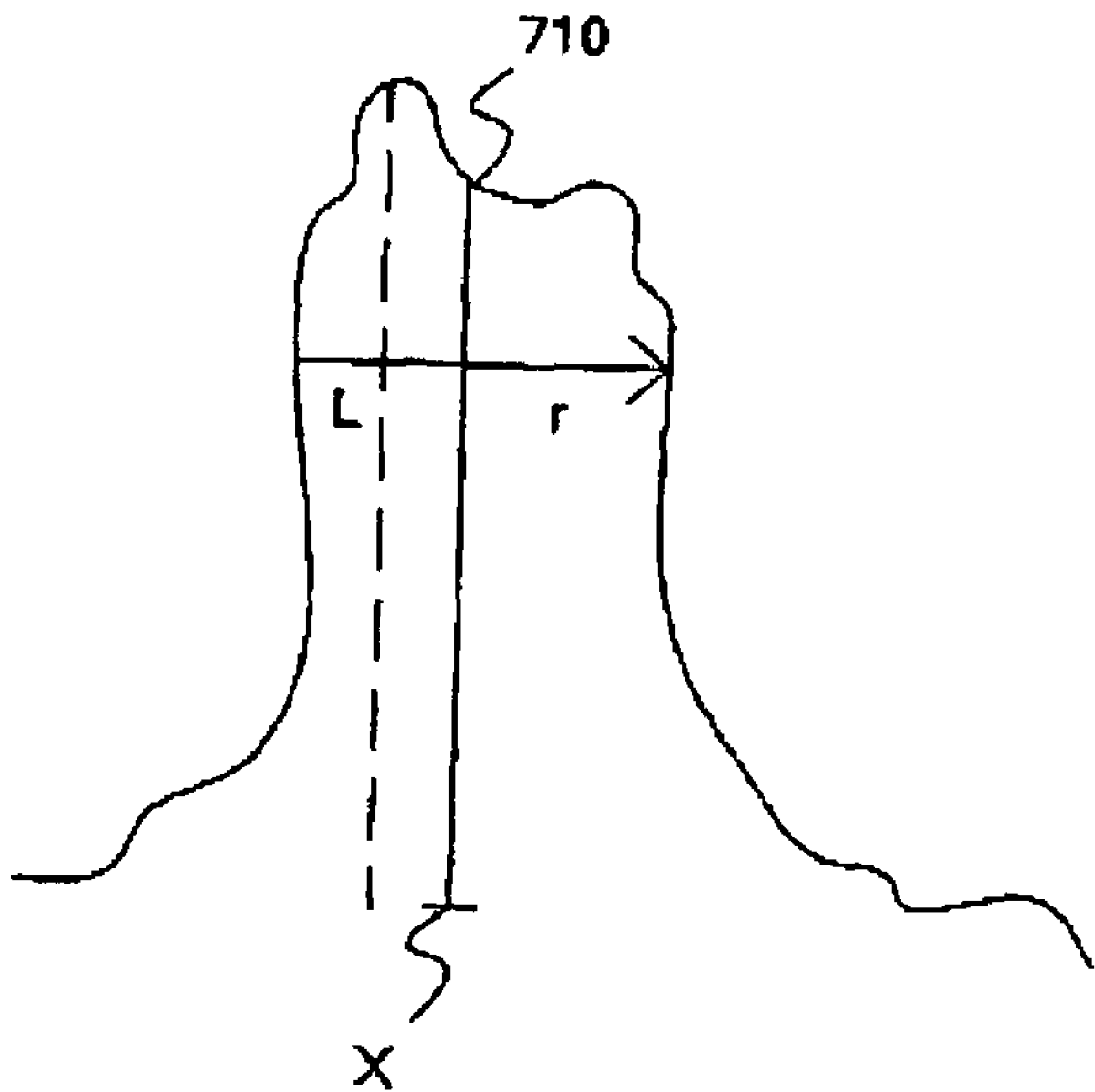
FIG. 7 is a graph illustrating the manner in which a unique point is detected from a peak in an alternate embodiment.

In FIG. 7, point 710 is the identified unique point with intensity value "x" and "l" represents the sum of intensity values on the left of point 710. Similarly, "r" represents the sum of intensity values on the right of point 710. If "l" equals "r", then point 710 is a unique point. If "l" is not equal to "r", then point 710 may be further divided into "xl" and "xr", where "xl=(l+x)/2" and "xr=(r+x)/2". If "l+xl" is greater than "r+xr", then "xl" may be further divided into two and so on. By identifying a unique point in the above described manner, sub-pixel level accuracy may be obtained.

In an embodiment, the plurality of unique points is interlinked to generate a chain and the chain is used to generate the 3D representation of the surface of the complex part. As used herein, "interlinking" refers to linking the plurality of unique points to generate a chain like structure. In the exemplary embodiment, the plurality of unique points are present in the form of parallel lines as the laser lines imposed on the complex part are parallel in nature. Thus, computation required to interlink the plurality of unique points is substantially reduced. In embodiments where the plurality of unique points do not follow a parallel line pattern due to factors such as background noise and the shape of the measured complex part, interlinking can be advantageously used. Single pixel gaps between the chains are filled by approximation of the neighboring unique points. Interlinking of the unique points into chains suppresses noise and also increases the speed of reconstruction of the 3D representation of the surface of the complex part.

In another embodiment (not shown), a system for the non-contact measurement of dimensions of a complex part comprises at least one imaging device, at least one intermediate processor and a main processor. The imaging device is positioned at a pre-determined distance from the complex part and is configured for acquiring an image of the complex part including imposed laser lines on the complex part.

The intermediate processor is coupled to the imaging device and receives the image and is configured for determining a span of interest of the complex part being representative of at least a portion of the image of the complex part and which comprises information related to the plurality of dimensions of the surface of the complex part.

The intermediate processor is further configured for extracting information corresponding to the laser lines from the span of interest to reduce computation and extracting a plurality of unique points from the information corresponding to the laser lines. The plurality of unique points represents the plurality of dimensions of the surface.

A main processor is coupled to the intermediate processor and is configured for reconstructing a three-dimensional (3D) representation of the surface of the complex part using the plurality of unique points. The 3D representation is used for inspection.

The advantages of the invention include improving the accuracy in the measurement of the dimensions of the complex part and also increasing the speed at which the 3D representation of the complex part can be reconstructed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for non-contact measurement of a complex part, the method comprising:
    acquiring an image of the complex part including imposed laser lines on the complex part using at least one imaging device;
    determining a span of interest of the complex part, the span of interest being representative of at least a portion of the complex part and which contains information related to a plurality of dimensions of a surface of the complex part; and
    extracting information corresponding to the laser lines from the span of interest, including scanning a plurality of rows in the span of interest, wherein each of the plurality of rows comprises a plurality of pixels, detecting a plurality of peaks by continuously comparing an intensity value of each pixel with an intensity value of an adjacent pixel, generating a rise intensity value point, a maximum intensity value point and a fall intensity value point for each of the plurality of peaks and balancing the rise intensity value point and the fall intensity value point to generate a foot intensity value point for each of the plurality of peaks, and further extracting a plurality of unique points from the information corresponding to the laser lines using the rise intensity value point, the maximum intensity value point, the fall intensity value point and the foot intensity value point for each of the plurality of peaks, the plurality of unique points representing the plurality of dimensions of the surface.

2. The method of claim 1, further comprising reconstructing a three-dimensional (3D) representation of the surface of the complex part using the plurality of unique points, wherein the 3D representation is used for inspection.

3. The method of claim 1, wherein the determining step comprises:
    dividing the image into a plurality of sections, each of said plurality of sections comprising a plurality of pixels, each pixel having a corresponding intensity value;
    calculating the sum of the plurality of intensity values of each pixel in each of said plurality of sections to generate a corresponding intensity value profile of the image; and
    extracting a portion of the image comprising information related to the plurality of dimensions of the surface of the complex part using the intensity value profile of the image.

4. The method of claim 3, wherein each of the plurality of sections comprises a rectangular section.

5. The method of claim 1, wherein the extracting step further comprises:
    calculating a mid-intensity value point on a respective rise side and a respective fall side of each of said plurality of peaks according to the equation:

$E_M = E_P + (E_{Max} - E_P)/2;$ wherein $E_M$ corresponds to the mid-intensity value point, $E_P$ corresponds to the foot intensity value point and $E_{Max}$ is the maximum intensity value point;
    tracing two tangents passing through the mid-intensity value point on the respective rise side and the respective fall side of each of the plurality of peaks; and
    defining the plurality of unique points at the intersection of the two tangents for each of the corresponding plurality of peaks.

6. The method of claim 5, wherein the tangents are traced using a Cubic Spline fit.

7. The method of claim 1, further comprising interlinking the plurality of unique points to generate a chain and using the chain to generate a three-dimensional (3D) representation of the surface of the complex part.

8. The method of claim 1, wherein the imaging device comprises a camera.

9. The method of claim 1, wherein the acquiring step comprises acquiring a plurality of images comprising a corresponding plurality of views of the complex part, from a plurality of imaging devices.

10. The method of claim 1, wherein the acquiring step comprises acquiring a plurality of images of the complex part by moving the imaging device around the complex part, wherein the complex part is fixed.

11. A system for non-contact measurement of a complex part, the system comprising:
    at least one imaging device positioned at a pre-determined distance from the complex part and configured for acquiring an image of the complex part including imposed laser lines on the complex part; and
    at least one processor coupled to the imaging device and receiving the image and configured for:
        determining a span of interest of the complex part, the span of interest being representative of at least a portion of the complex part and which contains information related to a plurality of dimensions of a surface of the complex part; and
        extracting information corresponding to the laser lines from the span of interest, including scanning a plurality of rows in the span of interest, wherein each of the plurality of rows comprises a plurality of pixels, detecting a plurality of peaks by continuously comparing an intensity value of each pixel with an intensity value of an adjacent pixel, generating a rise intensity value point, a maximum intensity value point and a fall intensity value point for each of the plurality of peaks and balancing the rise intensity value point and the fall intensity value point to generate a foot intensity value point for each of the plurality of peaks, and further extracting a plurality of unique points from the information corresponding to the laser lines using the rise intensity value point, the maximum intensity value point, the fall intensity value point and the foot intensity value point for each of the plurality of peaks, the plurality of unique points representing the plurality of dimensions of the surface.

12. The system of claim 11, wherein the processor is further configured for reconstructing a three-dimensional (3D) representation of the surface of the complex part using the plurality of unique points, wherein the 3D representation is used for inspection.

13. The system of claim 11, wherein the processor is further configured for:
dividing the image into a plurality of sections, each of said plurality of sections comprising a plurality of pixels, each pixel having a corresponding intensity value;
calculating the sum of the plurality of intensity values of each pixel in each of said plurality of sections to generate a corresponding intensity value profile of the image; and
extracting a portion of the image comprising information related to the plurality of dimensions of the surface of the complex part using the intensity value profile of the image.

14. The system of claim 13, wherein each of the plurality of sections comprises a rectangular section.

15. The system of claim 11, wherein the processor is further configured for:
calculating a mid-intensity value point on a respective rise side and a respective fall side of each of said plurality of peaks according to the equation:

$E_M = E_P + (E_{Max} - E_P)/2;$ wherein $E_M$ corresponds to the mid-intensity value point, $E_P$ corresponds to the foot intensity value point and $E_{Max}$ is the maximum intensity value point;
tracing two tangents passing through the mid-intensity value point on the respective rise side and the respective fall side of each of the plurality of peaks; and
defining the plurality of unique points at the intersection of the two tangents for each of the corresponding plurality of peaks.

16. The system of claim 15, wherein the tangents are traced using a Cubic Spline fit.

17. The system of claim 11, wherein processor is further configured for interlinking the plurality of unique points to generate a chain and using the chain to generate a three-dimensional (3D) representation of the surface of the complex part.

18. A method for non-contact measurement of a complex part, the method comprising:
acquiring an image of the complex part;
determining a span of interest of the complex part that includes multiple dimensions of a surface of a complex part;
detecting a peak based on comparing an intensity value of a pixel in the image to an intensity value of another pixel in the image, wherein the peak includes a rise side and a fall side;
tracing a rise side tangent through the rise side and a fall side tangent through the fall side,
wherein tracing the tangents includes detecting a rise intensity value point on the rise side, a maximum value intensity point between the rise and fall sides and a fall intensity value point on the fall side and calculating a foot intensity value point by balancing the rise intensity value point and the fall intensity value point;
extracting a unique point for the peak that is spaced from the peak at the intersection of the tangents; and
reconstructing a three-dimensional representation of the surface in the span of interest using the unique point.

19. The method of claim 18, wherein detecting the peak includes comparing the intensity value of the pixel to an intensity value of an adjacent pixel.

20. The method of claim 18, wherein detecting the peak includes performing a first derivative of the pixel with neighboring pixels.

21. The method of claim 18, wherein detecting the peak includes performing a second derivative of the pixel with neighboring pixels.

22. The method of claim 18, wherein tracing the tangents includes using piecewise polynomial regression.

23. The method of claim 18, wherein tracing the tangents includes using a Cubic Spline fit.

24. The method of claim 18, wherein tracing the tangents includes tracing the rise side tangent through a mid-intensity value point on the rise side and tracing the fall side tangent through the mid-intensity value point on the fall side.

25. The method of claim 18, wherein tracing the tangents includes:
calculating a mid-intensity value point according to the equation:

$E_M = E_P + (E_{Max} - E_P)/2$ where $E_M$ is the mid-intensity value point, $E_P$ is the foot intensity value point and $E_{Max}$ is the maximum intensity value point;
tracing the rise side tangent through the mid-intensity value point on the rise side; and
tracing the fall side tangent through the mid-intensity value point on the fall side.

* * * * *